United States Patent [19]

Naka

[11] 4,366,918
[45] Jan. 4, 1983

[54] VARIABLE RATIO METERING, MIXING AND DISPENSING APPARATUS

[75] Inventor: Kozo Naka, Hirakata, Japan

[73] Assignee: Naka Seiki Company Limited, Japan

[21] Appl. No.: 140,144

[22] Filed: Apr. 14, 1980

[30] Foreign Application Priority Data

Apr. 20, 1979 [JP] Japan .............................. 54/49421
Dec. 12, 1979 [JP] Japan ............................. 54/162000
Dec. 12, 1979 [JP] Japan ............................. 54/162001

[51] Int. Cl.³ ........................................ G01F 11/06
[52] U.S. Cl. ................................ 222/134; 222/334; 74/522
[58] Field of Search ............... 222/134, 135, 334; 74/522

[56] References Cited

U.S. PATENT DOCUMENTS 2,895,644  7/1959  Pande .............................. 222/134
3,212,676 10/1965  Trumbull et al. .............. 222/134 X
3,386,623  6/1968  Berrill et al. ................... 222/134

FOREIGN PATENT DOCUMENTS 2338226  2/1974  Fed. Rep. of Germany ...... 222/134
395285  12/1965  Switzerland ....................... 222/134

Primary Examiner—Joseph J. Rolla
Assistant Examiner—Frederick R. Handren
Attorney, Agent, or Firm—Larson and Taylor

[57] ABSTRACT

A variable ratio metering, mixing and dispensing apparatus comprises a plunger pump for a main component which is driven by a piston-cylinder assembly, a plunger pump for a hardener which is driven by a piston-cylinder assembly, and a mixer for mixing together the main component from the main component pump and the hardener from the hardener pump. The plunger of the main component pump and the plunger of the hardener pump are connected by adjustable metering means.

18 Claims, 8 Drawing Figures

VARIABLE RATIO METERING, MIXING AND DISPENSING APPARATUS

This invention relates to a variable ratio metering, mixing and dispensing apparatus, and more particularly to an apparatus by which the components of a two-component curable composition such as an encapsulating, sealing, molding, adhesive or like composition, for example, the main component and the hardener of a two-component adhesive composition can be withdrawn from their sources by plunger pumps in a ratio determined by an adjustable metering mechanism, then mixed together in a mixer and finally dispensed for application.

An apparatus of this type is known which comprises a pump having a cam follower attached to the rear end of its plunger and bearing against an adjustable metering wedge cam and another pump similarly provided with a cam follower in contact with a nonadjustable metering wedge cam, such that the wedge cams control the movement of the pump plungers through the cam followers to determine the ratio of the main component to the hardener to be mixed therewith. With this prior-art apparatus, the wedge cams, when advanced, drive the cam followers in directions at right angles to the direction of advance of the wedge cams, so that the great frictional resistance produced between the cams and followers markedly wears away the cams and followers, consequently shortening the life of these members.

Another apparatus is also known which comprises a fixed plunger pump having a plunger connected to a pivotable arm and a plunger pump shiftable along the pivotable arm and having its plunger connected to the arm, such that the mixing ratio is determined by the ratio between the distances from the pivot of the arm to the centers of the two pumps, namely by the lever ratio. This apparatus is not easy to handle since the shiftable pump itself must be moved to alter the mixing ratio.

Accordingly the main object of this invention is to provide a variable ratio metering, mixing and dispensing apparatus which includes metering means having a prolonged life and which gives a variable mixing ratio with ease without the necessity of moving any pump.

Other objects of the invention will become apparent from the following description.

The present invention provides a variable ratio metering, mixing and dispensing apparatus comprising a plunger pump having input-output switching means for withdrawing a main component from a main component source, a plunger pump having input-output switching means and disposed in parallel to the main component pump for withdrawing a hardener from a hardener source, a first piston-cylinder assembly for driving the main component pump, a second piston-cylinder assembly for driving the hardener pump, a mixer for mixing together the main component from the main component pump and the hardener from the hardener pump, and adjustable metering means for determining the ratio of the main component to the hardener to be mixed therewith, the metering means including a first actuating member, a second actuating member and an adjustable control mechanism for connecting the first actuating member to the second actuating member, the first actuating member, the plunger of the main component pump and the piston rod of the first piston-cylinder assembly being connected so as to be movable together, the second actuating member, the plunger of the hardener pump and the piston rod of the second piston-cylinder assembly being connected so as to be movable together, the control mechanism including a first arm turnable forward or backward longitudinally of the plungers of the pumps, a second arm movable forward or backward longitudinally of the pump plungers, a pin mounted on the first actuating member and connected to the first arm slidably along the first arm, and a pin mounted on the second arm shiftably therealong and connected to the first arm slidably therealong.

During the operation of the pumps according to the invention, the pin on the first actuating member of the metering means moves forward or backward longitudinally of the plunger of the main component pump and, at the same time, the pin on the second arm fixed to the second actuating member of the metering means moves forward or backward longitudinally of the plunger of the hardener pump. With the movement of these pins, the first arm of the metering means pivotally moves in the same direction as the pins, permitting the pins to slide along the first arm. When the pumps are in operation, the pins are therefore slidable on the first arm without producing great frictional resistance that is involved in the metering means comprising wedge cams. Consequently the metering means of the invention is serviceable over a prolonged life.

According to the invention, the ratio between the distances from the pivot of the first arm to the centers of the two pins determines the ratio in the amount of forward or backward movement between the first actuating member and the second actuating member. The latter ratio further determines the ratio between the strokes of the plungers of the main component pump and the hardener pump, namely the ratio of the main component relative to the hardener.

When the pin on the second arm is shifted along the arm, the ratio between the distances from the pivot of the first arm to the centers of the two pins alters. Thus the mixing ratio between the main component and the hardener is variable easily by shifting the pin on the second arm without the necessity of moving the pump itself.

According to the invention, the main component supplied from the main component pump and the hardener from the hardener pump are mixed together in a mixer, and the resulting mixture is forced out from the apparatus by the pressure applied by the pumps on the two components.

When the component and the hardener have been dispensed after mixing in the mixer, it is preferable to clean the mixing system with a solvent or cleaning agent in preparation for the subsequent operation. This can be done, for example, by bringing a channel for the cleaning agent into communication with the main component channel and hardener channel of the mixer and passing the agent through these channels.

The invention will be described below with reference to embodiments thereof shown in the accompanying drawings, in which.

Throughout FIGS. 1 to 8 like parts are referred to by like reference numerals.

Figure 1:
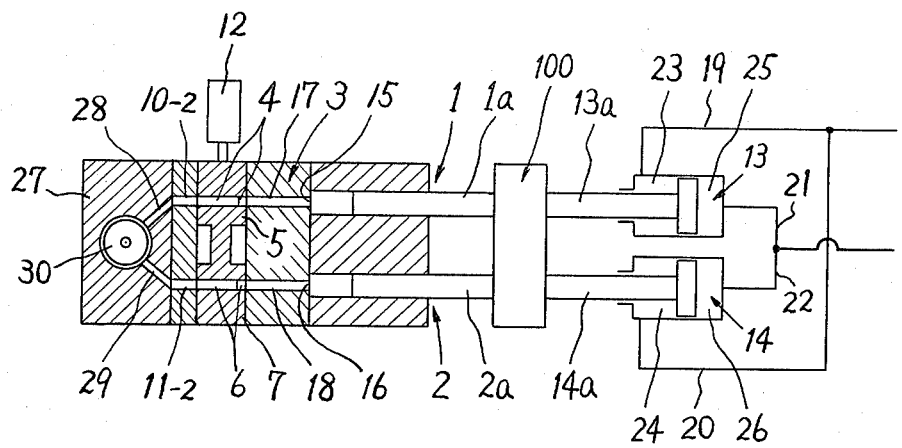
FIG. 1 is a plan view in section of an embodiment of the invention in which adjustable metering means is shown schematically as a rectangle.
Figure 2:
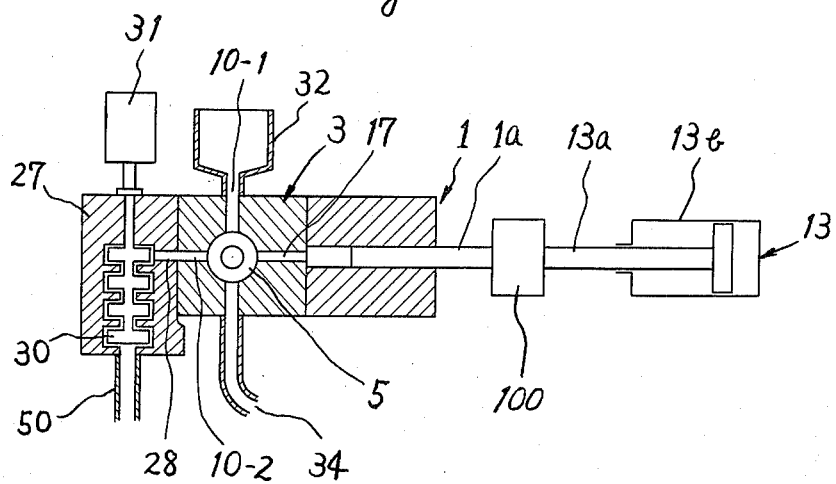
FIG. 2 is a side elevation showing the embodiment of FIG. 1.
Figure 3:
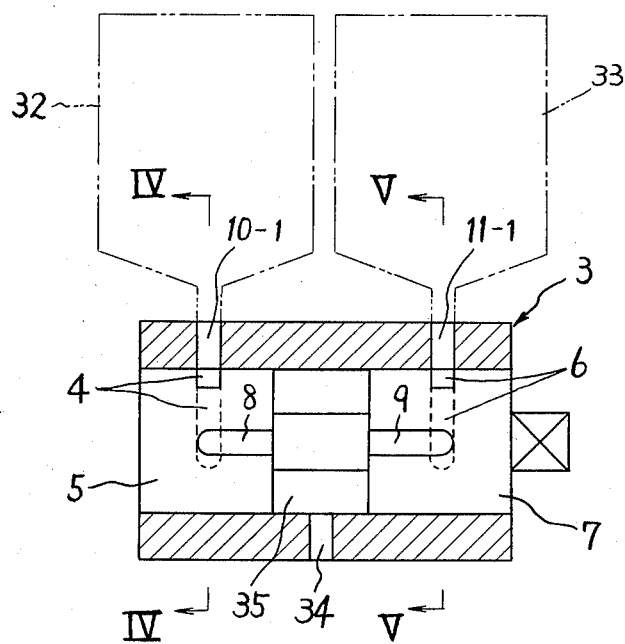
FIG. 3 is an enlarged sectional view showing an input-output switching valve included in the embodiment.
Figure 4:
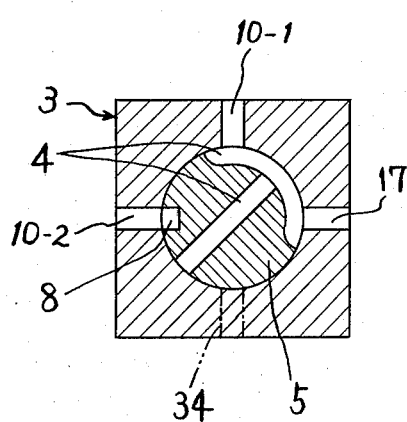
FIG. 4 is a view in section taking along the line IV—IV in FIG. 3.
Figure 5:
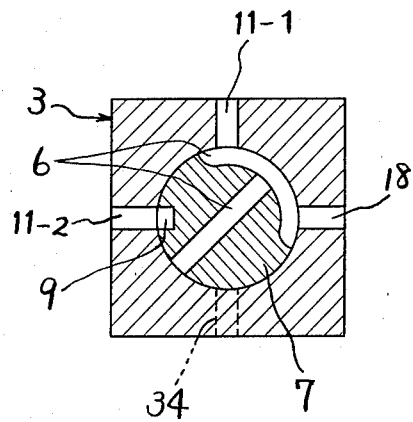
FIG. 5 is a view in section taken along the line V—V in FIG. 3.
Figure 6:
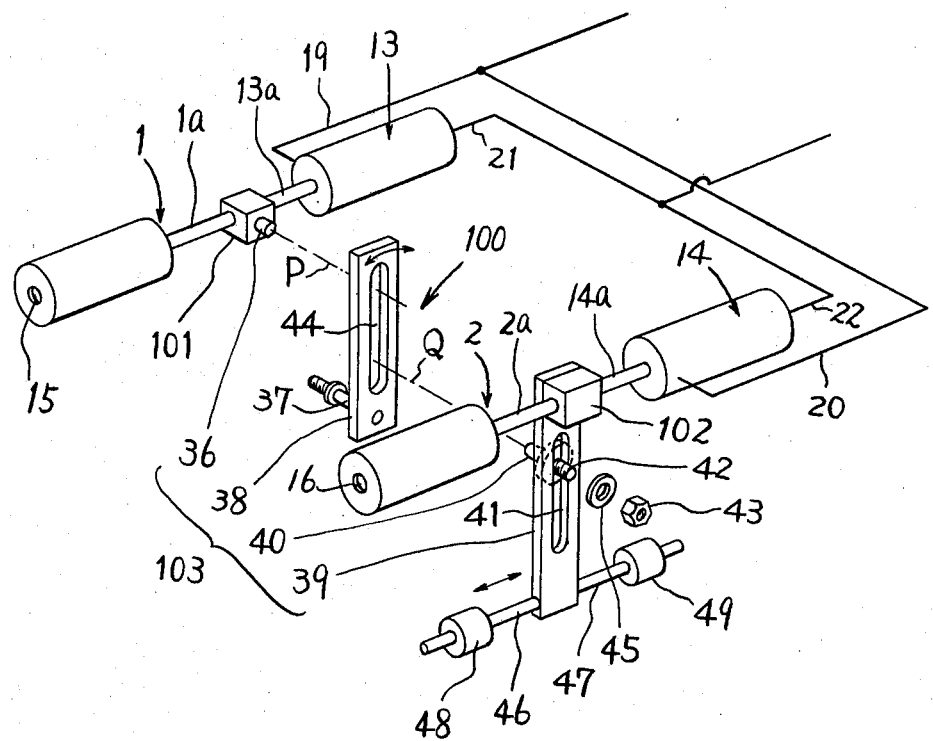
FIG. 6 is an exploded perspective view showing the adjustable metering means in detail.

With reference to FIGS. 1 to 6 showing an embodiment of this invention, a plunger pump 1 for the main component is disposed in parallel with a hardener plunger pump 2. The plunger 1a of the pump 1 and the plunger 2a of the pump 2 may be identical in diameter or have different standard diameters. A rotary valve 3 is used in this embodiment as input-output switching means for the pumps 1, 2. The rotary valve 3 has rotors 5, 7 which are connected to each other. The rotor 5 has control channels 4 for the main component, and the rotor 7 control channels 6 for the hardener. The rotors 5, 7 are formed with channels 8, 9 for a solvent or cleaning agent which are each always in communication at its one end with a solvent or cleaning agent inlet 34 formed in the valve 3, through a space 35 between the rotors 5, 7. The other ends of the channels 8, 9 are adapted to communicate with outlet or secondary ports 10-2, 11-2 of the valve 3 when the rotors 5, 7 are turned for displacement by an actuator 12. The valve 3 has inlet or primary ports 10-1, 11-1 communicating with a main component source 32 and a hardener source 33 respectively.

The plunger 1a of the pump 1 is connected to the piston rod 13a of a first pneumatic or oil pressure piston-cylinder assembly 13 by a first actuating member 101 of the adjustable metering means 100 to be described later. The plunger 2a of the pump 2 is connected to the piston rod 14a of a second pneumatic or oil pressure piston-cylinder assembly 14 by a second actuating member 102 of the metering means 100. Thus the plunger 1a of the pump 1, the piston rod 13a of the piston-cyclinder assembly 13 and the first actuating member 101 of the metering means 100 are movable together. The plunger 2a of the pump 2, the piston rod 14a of the piston-cylinder assembly 14 and the second actuating member 102 of the metering means 100 are also movable together. The piston-cylinder assemblies 13, 14 are provided with pressure fluid conduits 19, 20, 21, 22, have cylinder front chambers 23, 24 which are held in communication with each other by the conduits 19, 20 and possess cylinder rear chambers 25, 26 which are held in communication with each other by conduits 21, 22.

Instead of connecting together the plunger 1a, piston rod 13a and first actuating member 101 by the above arrangement, the plunger 1a may be connected directly to the piston rod 13a, with the first actuating member 101 connected to either the plunger 1a or the piston rod 13a. Similarly the plunger 2a may be connected directly to the piston rod 14a, with the second actuating member 102 connected to the plunger 2a or piston rod 14a.

An inlet-outlet port 15 of the pump 1 and an inlet-outlet port 16 of the pump 2 communicate with corresponding ports 17, 18 of the valve 3 respectively.

A mixer 27 has a main component inlet 28 and a hardener inlet 29 which are in communication with the secondary ports 10-2, 11-2 of the valve 3. The mixer 27 includes a mixing rotor 30 which is driven by a motor 31.

The adjustable metering means 100 comprises the first actuating member 101, the second actuating member 102 and a control mechanism 103 for connecting the first and second actuating members 101, 102 together. The control mechanism 103 includes a pin 36 attached to the first actuating member 101, a first arm 38 turnable about a pivot 37 forward or backward longitudinally of the plunger 1a of the pump 1 and the plunger 2a of the pump 2, a second arm 39 attached to the second actuating member 102, and a pin 40 mounted on the second arm 39. A screw rod 42 extending from the pin 40 is inserted in a slot 41 formed in the arm 39 longitudinally thereof and is fastened to the arm 39 with a nut 43 and a washer 45. The pins 36, 40 are inserted in a slot 44 formed in the first arm 38 longitudinally thereof and are slidable along the slot 44. Rods 46, 47 in parallel to the plunger 2a and to the piston 14a are secured to the second arm 39 and supported by slide bearings 48, 49 fixed to an unillustrated frame. Thus the first actuating member 101 and the second actuating member 102 are operatively connected to each other by the control mechanism 103.

The pin 40 is shiftable when the nut 43 is loosened. When the pin 40 is located, for example, in the position P shown in FIG. 6 in alignment with the pin 36, the ratio of the amount of forward or backward movement of the second actuating member 102 to that of the first actuating member 101 is 1:1, with the result that the stroke ratio between the plunger 1a of the pump 1 and the plunger 2a of the pump 2 is 1:1. Further when the pin 40 is, for example, in the position Q shown in FIG. 6, the stroke of the plunger 2a of the pump 2 is smaller than the stroke of the plunger 1a of the pump 1.

The apparatus shown in FIGS. 1 to 6 operates in the following manner.

When the piston rod 13a of the first piston-cylinder assembly 13 and the piston rod 14a of the second piston-cylinder assembly 14 are retracted, with the rotors 5, 7 of the valve 3 in their suction position (the position of FIGS. 4 and 5), the plunger 1a of the main component pump 1 and the plunger 2a of the hardener pump 2 are retracted by the retracting movement, whereby the main component is forced out from the source 32 through the valve 3 into the pump 1, and the hardener from the source 33 through the valve 3 into the pump 2.

With the rotors 5, 7 subsequently switched to their output position (in which the channels 4, 6 communicate with the ports 10-2, 11-2 respectively), the piston rods 13a, 14a are advanced, whereby the main component in the pump 1 is forced out by the plunger 1a into the mixer 27 through the valve 3 and inlet 28, and the hardener in the pump 2 is sent out by the plunger 2a into the mixer 27 through the valve 3 and inlet 29.

During the pumping operation described above, the plungers 1a, 2a advance and retract in a ratio in accordance with the ratio of advance and retraction between the first actuating member 101 and the second actuating member 102 which ratio is determined by the position of the pin 40 relative to the pin 36. This determines the ratio of the output of the main component from the pump 1 to the output of the hardener from the pump 2.

The main component and the hardener fed to the mixer 27 are stirred and mixed together by the rotor 30 in the mixer 27. The resulting mixture is forced out through a discharge duct 50 by the pressure exerted by the pumps 1, 2 and the two components.

The mixing system can be cleaned by forcing a cleaning agent into the inlet 34 by supplying means (not shown), with the channels 8, 9 of the rotors 5, 7 in communication with the secondary ports 10-2, 11-2 of the valve 3. The cleaning agent fed to the inlet 34 enters the space 35 and flows into the mixer 27 via the channel 8, port 10-2 and inlet 28 and also via the channel 9, port 11-2 and inlet 29.

Figure 7:
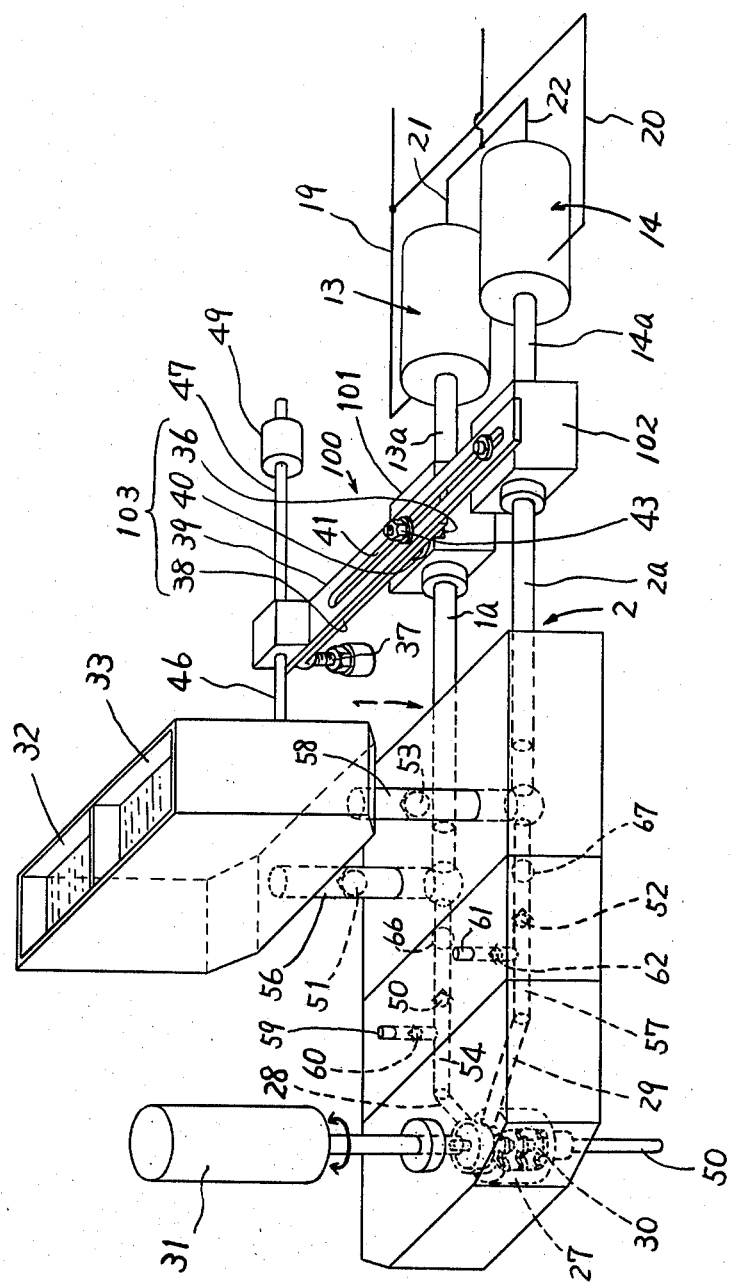
FIG. 7 is a perspective view showing a modified embodiment.
Figure 8:
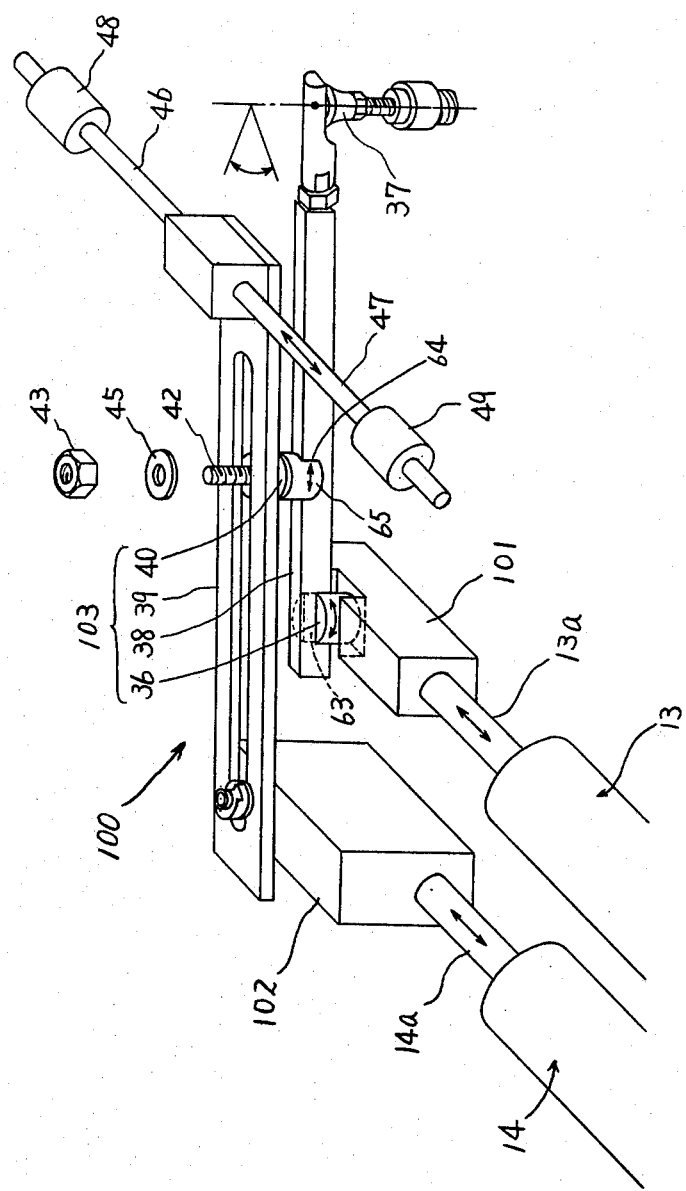
FIG. 8 is an enlarged perspective view showing adjustable metering means included in the embodiment of FIG. 7.

FIGS. 7 and 8 show a modified embodiment of the invention.

The embodiment of FIGS. 7 and 8 has substantially the same construction as the embodiment of FIGS. 1 to 6 with the exception of check valves 50, 51, 52 and 53 used as input-output switching means, a cleaning agent supplying system modified in conformity with the arrangement of these valves, and a modified mode of connection between the pins 36, 40 and the first arm 38.

With reference to FIGS. 7 and 8, the check valve 50 is provided for an output channel 54 of the pump 1, the check valve 51 for an input channel 56 of the pump 1, the check valve 52 for an output channel 57 of the pump 2, and the check valve 53 for an input channel 58 of the pump 2. Preferably the channels 54, 57 are provided, upstream from the check valves 50, 52, with mechanical shut-off valves which are opened or closed when the pumps 1, 2 are switched for output or input operation. These valves are schematically indicated at 66, 67 in FIG. 7. A cleaning agent inlet pipe 59 is connected to the output channel 54 at a location downstream from the check valve 50. The pipe 59 has a check valve 60. A cleaning agent inlet pipe 61 is connected to the output channel 57 at a location downstream from the check valve 52 and has a check valve 62.

With the second embodiment, the pin 36 is formed with a slide groove 63 having the first arm 38 fitted therein and is pivoted to the first actuating member 101. The pin 40 has pivoted thereto a slidable piece 65 having a slide groove 64 with the first arm 38 fitted therein. The pin 40 is mounted on the second arm 39 in the same manner as in the embodiment of FIGS. 1 to 6.

According to the second embodiment, the main component and the hardener can be fed to the mixer 27 by retracting and advancing the plungers 1a, 2a of the pumps 1, 2 without the necessity of switching the pumps for input and output positions by the input-output switching means. The mixture prepared in the mixer 27 is discharged from the duct 50 as in the first embodiment. The adjustable metering means 100 of the second embodiment serves the same function as that of the first embodiment. The cleaning agent led in through the pipes 59, 61 is sent to the mixer via the channel 54 and inlet 28 and via the channel 57 and inlet 29.

I claim:

1. A variable ratio metering, mixing and dispensing apparatus comprising a plunger pump having input-output switching means for withdrawing a main component from a main component source, a plunger pump having input-output switching means and disposed in parallel to the main component pump for withdrawing a hardener from a hardener source, a first piston-cylinder assembly for driving the main component pump, a second piston-cylinder assembly for driving the hardener pump, a mixer for mixing together the main component from the main component pump and the hardener from the hardener pump, and adjustable metering means for determining the ratio of the main component to the hardener to be mixed therewith, the metering means including a first actuating member, a second actuating member and an adjustable control mechanism for connecting the first actuating member to the second actuating member, the first actuating member, the plunger of the main component pump and the piston rod of the first piston-cylinder assembly being connected so as to be movable together, the second actuating member, the plunger of the hardener pump and the piston rod of the second piston-cylinder assembly being connected so as to be movable together, the control mechanism including a first arm turnable about a pivot forward or backward longitudinally of the plungers of the pumps, a second arm movable forward or backward longitudinally of the pump plungers, a pin mounted on the first actuating member and connected to the first arm slidably along the first arm, and a pin mounted on the second arm shiftably therealong and connected to the first arm slidably therealong.

2. An apparatus as defined in claim 1 wherein the first arm is formed with a slot extending longitudinally thereof, and the pin on the first actuating member and the pin on the second arm are inserted in the slot and thereby made slidable along the first arm.

3. An apparatus as defined in claim 1 wherein the pin on the first actuating member is formed with a slide groove, and the pin on the second arm has pivoted thereto a slidable piece formed with a slide groove, the first arm being fitted in the slide groove of the pin and the slide groove of the slidable piece, whereby the pins are made slidable along the first arm.

4. An apparatus as defined in claim 1 wherein the input-output switching means for the main component pump and the hardener pump comprise a rotary valve including a rotor having control channels for the main component and a rotor having control channels for the hardener.

5. An apparatus as defined in claim 4 further comprising means for supplying a cleaning agent to the mixer.

6. An apparatus as defined in claim 5 wherein the cleaning agent supplying means includes a cleaning agent inlet formed in the rotary valve and communicating with inlet channels of the mixer through channels in the rotary valve.

7. An apparatus as defined in claim 1 wherein the input-output switching means for the main component pump and the hardener pump comprise a check valve provided for an input channel of the main component pump, a check valve provided for an outlet channel of the main component pump, a check valve provided for an inlet channel of the hardener pump and a check valve provided for an outlet channel of the hardener pump.

8. An apparatus as defined in claim 7 wherein both the output channel of the main component pump and the output channel of the hardener pump are provided upstream from the check valve in the corresponding channel with a mechanical shut-off valve which is opened when a plunger of the pump is advanced and closed when said plunger is retracted.

9. An apparatus as defined in claim 7 further comprising means for supplying a cleaning agent to the mixer.

10. An apparatus as defined in claim 9 wherein the cleaning agent supplying means includes a cleaning agent inlet pipe connected to the output channel of the main component pump at a location downstream from the check valve in the same channel and a cleaning agent inlet pipe connected to the output channel of the hardener pump at a location downstream from the check valve in the same channel, each of the cleaning agent inlet pipes having a check valve.

11. An apparatus as defined in claim 1 wherein each of the first and second piston-cylinder assemblies is a pneumatic piston-cylinder assembly.

12. An apparatus as defined in claim 1 wherein each of the first and second piston-cylinder assemblies is an oil pressure piston-cylinder assembly.

13. An apparatus as defined in claim 1 wherein the pin on the second arm of the adjustable metering means is so positioned that the distance of the center of the pin from the pivot of the first arm is equal to the distance of the center of the pin on the first actuating member from the pivot.

14. An apparatus as defined in claim 1 wherein each of the piston-cylinder assemblies is provided with a cylinder front chamber and a cylinder rear chamber and a pressure fluid conduit extending from the cylinder front chamber of the first piston-cylinder assembly is in communicating with a pressure fluid conduit extending from the cylinder front chamber of the second piston-cylinder assembly, and a pressure fluid conduit of the cylinder rear chamber of the first piston-cylinder assembly is in communication with a pressure fluid conduit of the cylinder rear chamber of the second piston-cylinder assembly.

15. A variable ratio metering, mixing and dispensing apparatus comprising a plunger pump having input-output switching means for withdrawing a main component from a main component source, a plunger pump having input-output switching means and disposed in parallel to the main component pump for withdrawing a hardener from a hardener source, a first fluid-pressure piston-cylinder assembly for driving the main component pump, a second fluid-pressure piston-cylinder assembly for driving the hardener pump, a mixer for mixing together the main component from the main component pump and the hardener from the hardener pump, and adjustable metering means for determining the ratio of the main component to the hardener to be mixed therewith, the input-output switching means of the main component pump comprising a check valve provided for an input channel of the main component pump and a check valve provided for an output channel of the main component pump, the input-output switching means of the hardener pump comprising a check valve provided for an input channel of the hardener pump and a check valve provided for an output channel of the hardener pump, the metering means including a first actuating member, a second actuating member and a ratio mechanism adjusting linkage for connecting the first actuating member to the second actuating member, the first actuating member, the plunger of the main component pump and the piston rod of the first fluid-pressure piston-cylinder assembly being connected so as to be movable together, the second actuating member, the plunger of the hardener pump and the piston rod of the second fluid-pressure piston-cylinder assembly being connected so as to be movable together, the ratio adjusting linkage including a first arm turnable about a pivot forward or backward longitudinally of the plungers of the pumps, a second arm movable forward or backward longitudinally of the pump plungers, a first slotted pin pivoted to the first actuating member and having a slot in which the first arm is slidably fitted, and a second slotted pin adjustably mounted for sliding movement along the second arm and having a slot in which the first arm is slidably fitted, the ratio between the distances from the pivot of the first arm to the centers of the two pins of the ratio adjusting linkage determining the ratio between the strokes of the first actuating member and the second actuating member, and thereby determining the ratio of the main component relative to the hardener to be mixed therewith.

16. An apparatus as defined in claim 15 wherein when the position of the second slotted pin is adjusted so that the distance from the pivot of the first arm to the center of the second slotted pin is such that the ratio betweem the strokes of the first arm and the second arm of 1:1 and the mixing ratio between the main component and the hardener is 1:1.

17. An apparatus as defined in claim 15 wherein each of the first and second fluid-pressure piston-cylinder assemblies is a pneumatic piston-cylinder assembly.

18. An apparatus as defined in claim 15 wherein each of the first and second fluid-pressure piston-cylinder assemblies is an oil pressure piston-cylinder assembly.

* * * * *